(12) United States Patent
Abe et al.

(10) Patent No.: US 6,495,625 B1
(45) Date of Patent: Dec. 17, 2002

(54) CHLOROPRENE TYPE RUBBER COMPOSITION

(75) Inventors: Yasushi Abe, Niigata (JP); Mitsuyuki Nakada, Niigata (JP); Isao Yamagishi, Niigata (JP); Kazuomi Aoki, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/719,536

(22) PCT Filed: Nov. 2, 1999

(86) PCT No.: PCT/JP99/06112

§ 371 (c)(1),
(2), (4) Date: Dec. 18, 2000

(87) PCT Pub. No.: WO01/32768

PCT Pub. Date: May 10, 2001

(51) Int. Cl.$^7$ ................................................. C08L 3/04
(52) U.S. Cl. ........................ 524/495; 524/439; 524/435; 524/551; 524/552; 524/847; 525/331.9; 525/333.1
(58) Field of Search ................................. 524/571, 495, 524/847; 525/326.3, 331.4

(56) References Cited

U.S. PATENT DOCUMENTS

| | | | | | |
|---|---|---|---|---|---|
| 4,360,627 A | * | 11/1982 | Okado et al. | ................ | 106/472 |
| 4,367,208 A | * | 1/1983 | Glasstetter et al. | ......... | 383/110 |
| 4,431,775 A | * | 2/1984 | Maeda et al. | ................ | 525/192 |
| 4,572,868 A | * | 2/1986 | Hosaka et al. | .............. | 428/328 |
| 5,037,360 A | * | 8/1991 | Fujiwara et al. | ............. | 474/202 |

FOREIGN PATENT DOCUMENTS

| | | |
|---|---|---|
| JP | 50-087437 | 7/1975 |
| JP | 2-34645 | 2/1990 |
| JP | 11-323020 | 11/1999 |

\* cited by examiner

*Primary Examiner*—David W. Wu
*Assistant Examiner*—Henry Hu
(74) *Attorney, Agent, or Firm*—Oblon, Spivak, McClelland, Maier & Neustadt, P.C.

(57) ABSTRACT

A chloroprene type rubber composition which comprises a chloroprene type rubber, a carbon black having an average stacking height Lc of at least 2 nm in a C axis direction of the layer planes in the crystallites, and a zinc powder.

24 Claims, No Drawings

CHLOROPRENE TYPE RUBBER COMPOSITION

TECHNICAL FIELD

The present invention relates to a chloroprene type rubber composition. More particularly, it relates to a chloroprene type rubber composition which provides a vulcanizate having a significantly improved heat resistance.

BACKGROUND ART

Heretofore, several methods have been proposed to improve the heat resistance of a vulcanizate of a chloroprene rubber composition. For example, JP-A-50-87437 discloses a method to improve the heat resistance by adding a zinc powder and water to a chloroprene rubber, JP-A-2-34645 discloses a method to improve the heat resistance by adding a zinc powder and thermal black, and JP-A-3-81350 discloses a method to improve the heat resistance by adding a zinc powder and 4,4'-(α,α-dimethylbenzyl)diphenylamine to a chloroprene rubber. However, the requirement for the heat resistance becomes strict with applications for e.g. rubber components for automobiles. Accordingly, the heat resistance is not always satisfactory with such known methods, and it has been desired to improve the heat resistance.

DISCLOSURE OF THE INVENTION

The present invention resides in a composition comprising a chloroprene type rubber and a specific carbon black and zinc powder incorporated in said rubber, and it is an object of the present invention to improve the heat resistance of a vulcanizate thereof.

Namely, the present inventors have conducted extensive studies to improve the heat resistance of a vulcanizate of a chloroprene type rubber composition and as a result, have found it possible to achieve the object by a combination of a chloroprene type rubber, a carbon black having an average stacking height Lc of at least 2 nm in a C axis direction of the layer planes in the crystallites, and a zinc powder. The present invention has been accomplished on the basis of this discovery.

Now, the present invention will be described in detail.

The chloroprene type rubber in the chloroprene type rubber composition of the present invention contains a chloroprene rubber as the main component, but may contain in addition to the chloroprene rubber, e.g. natural rubber, SBR, butyl rubber, BR, NBR or EPDM, as the case requires.

The chloroprene type rubber of the present invention may be a homopolymer of chloroprene or a copolymer (hereinafter often referred to as a chloroprene type rubber) obtained by polymerizing a mixture (hereinafter referred to as a chloroprene type monomer) comprising chloroprene and at least one other monomer copolymerizable with chloroprene.

Monomers copolymerizable with chloroprene include, for example, 2,3-dichloro-1,3-butadiene, 1-chloro-1,3-butadiene, sulfur, styrene, acrylonitrile, methacrylonitrile, isoprene, butadiene as well as acrylic acid, methacrylic acid and esters thereof, and they can be used within a range to satisfy the purpose of the present invention.

With respect to the polymerization method to obtain the chloroprene rubber to be used in the present invention, there is no particular limitation, and a conventional polymerization method may be employed. Namely, the chloroprene type monomer may be emulsion-polymerized by a conventional method in the presence of a polymerization initiator which is commonly used for polymerization of chloroprene, to obtain the chloroprene rubber.

The emulsifier to be used for this emulsion polymerization is not particularly limited, and an emulsifier which is commonly used for the emulsion polymerization of chloroprene, such as an alkali metal salt of a $C_{6-22}$ saturated or unsaturated fatty acid, an alkali metal salt of rosin acid or disproportionated rosin acid, or an alkali metal salt of a formalin condensate of β-naphthalene sulfonic acid, may, for example, be used.

Chloroprene rubbers are classified into a sulfur-modified type, a mercaptan-modified type and a xanthogen-modified type, depending upon the type of the molecular weight modifier. The sulfur-modified type is one obtained by copolymerizing sulfur and chloroprene to obtain a polymer and plasticizing the polymer with thiuram disulfide to have a predetermined Mooney viscosity. The mercaptan-modified type is one obtained by using as a molecular weight modifier an alkyl mercaptan such as n-dodecyl mercaptan, tert-dodecyl mercaptan or octyl mercaptan. Likewise, the xanthogen-modified type is one prepared by using as a molecular weight modifier an alkylxanthogen compound.

As the chloroprene type rubber of the present invention, any modified type may be used. Further, a chloroprene type rubber modified by a combination of sulfur, mercaptan and xanthogen may also be used. However, the sulfur-modified type has a poor heat resistance of the polymer itself as compared with the mercaptan-modified or xanthogen-modified type, and accordingly, it is preferred to use the mercaptan-modified or xanthogen-modified type in the case where a higher heat resistance is required.

Specific examples of the alkylxanthogen compound to be used for the xanthogen-modified type include dimethylxanthogen disulfide, diethylxanthogen disulfide, diisopropylxanthogen disulfide and diisobutylxanthogen disulfide.

The amount of the alkylxanthogen compound is selected so that the molecular weight of the chloroprene type polymer (or the Mooney viscosity of a chloroprene type rubber obtainable by isolating the polymer) will be proper. It is used usually in an amount within a range of from 0.05 to 5.0 parts by weight, preferably from 0.3 to 1.0 part by weight, based on 100 parts by weight of the chloroprene type monomer, although the amount may vary depending upon the structure of the alkyl group or the desired molecular weight.

As the polymerization initiator, known potassium persulfate, ammonium persulfate, sodium persulfate, hydrogen peroxide or an organic peroxide such as t-butyl hydroperoxide, may be used, which is commonly used for emulsion polymerization of chloroprene.

In the present invention, the polymerization temperature and the final conversion of the monomer are not particularly limited. However, the polymerization temperature is preferably from 0 to 50° C., more preferably from 20 to 50° C. Further, the polymerization is preferably carried out so that the final conversion of the monomer will be within a range of from 50 to 90%, and when this conversion has been reached, a small amount of a polymerization inhibitor may be added to terminate the polymerization.

As the polymerization inhibitor, a commonly employed inhibitor such as thiodiphenylamine, 4-tert-butylcatechol or 2,2-methylenebis-4-methyl-6-tert-butylphenol, may, for example, be used.

An unreacted monomer may be removed, for example, by steam stripping, and then the pH of the latex is adjusted, followed by e.g. conventional freeze solidification, washing with water and hot air drying to isolate the polymer.

The carbon black to be incorporated to the chloroprene type rubber composition of the present invention may be any one of thermal black and acetylene black prepared by a thermal decomposition method and furnace black and channel black prepared by an incomplete combustion method. However, such carbon blacks are required to have an average stacking height Lc of at least 2 nm in a C axis direction of the layer planes in the crystallites, and particularly preferred is one having an average stacking height Lc of at least 2.5 nm in a C axis direction of the layer planes.

Further, a preferred carbon black is one having an average particle size of at most 60 nm, and having a DBP oil absorption of preferably from 100 to 350 ml/100 g, more preferably from 120 to 300 ml/100 g, particularly preferably from 140 to 300 ml/100 g.

If the average stacking height Lc is less than 2 nm in a C axis direction of the layer planes in the crystallites, the heat resistance of a vulcanizate obtained by vulcanizing the chloroprene type rubber composition will be inadequate.

Further, acetylene black is a carbon black obtained by thermally decomposing acetylene gas, and the chloroprene type rubber composition using acetylene black is most preferred as the effect to improve the heat resistance of its vulcanizate is significant, since the crystallization is significantly advanced, the structure is highly developed, and the oil absorption is large.

The amount of the carbon black is preferably from 10 to 70 parts by weight, more preferably from 20 to 60 parts by weight, based on 100 parts by weight of the chloroprene type rubber. If the amount exceeds 70 parts by weight, the processability tends to be poor, scorch is likely to take place, and the embrittlement temperature of the vulcanizate tends to be high. If the amount is smaller than 10 parts by weight, the tensile strength and the modulus tend to be low.

With respect to the grain size of the zinc powder to be used in the present invention, preferred is one which passed through a 200-mesh screen. The amount of the zinc powder is preferably from 1 to 30 parts by weight, more preferably from 2 to 20 parts by weight, based on 100 parts by weight of the chloroprene type rubber. If the amount of the zinc powder is smaller than 1 part by weight, the heat resistance of the vulcanizate will not adequately be improved, and if it is larger than 30 parts by weight, the mechanical properties of the vulcanizate tend to be low.

The vulcanizer to be used in the present invention is not particularly limited, but is preferably a metal oxide. Specifically, zinc oxide, magnesium oxide, lead oxide, trilead tetraoxide, iron trioxide, titanium dioxide or calcium oxide may, for example, be mentioned. They may be used in combination as a mixture of two or more of them. The amount of such a vulcanizer is preferably from 3 to 15 parts by weight based on 100 parts by weight of the chloroprene type rubber.

Further, by using said vulcanizer in combination with the following vulcanization accelerator, vulcanization can be carried out more effectively.

As the vulcanization accelerator, a vulcanization accelerator of thiourea type, guanidine type, thiuram type, thiazol type or triazine type, which is commonly used for vulcanization of the chloroprene type rubber, may be used. However, one of thiourea type is preferred. As the vulcanization accelerator of thiourea type, ethylenethiourea, diethylthiourea, trimethylthiourea, triethylthiourea or N,N'-diphenylthiourea may, for example, be mentioned, and trimethyl thiourea is particularly preferred. Further, a vulcanization accelerator such as a mixture comprising 3-methylthiazolidine thione-2 or thiadiazole and phenylenedimaleimide, or dimethylammonium hydrogen isophthalate or a 1,2-dimercapto-1,3,4-thiadiazole derivative, may also be used. The above vulcanization accelerators may be used in combination as a mixture of two or more of them. Further, a peroxide vulcanization type may also be used. The amount of such a vulcanization accelerator is preferably from 0.5 to 5 parts by weight based on 100 parts by weight of the chloroprene type rubber.

To the chloroprene type rubber composition of the present invention, various additives such as a softening agent, a plasticizer, a processing aid, an aging-preventing agent, a lubricant, a filler, etc., may be incorporated as the case requires.

As the aging-preventing agent, a common aging-preventing agent of e.g. amine type, imidazole type, a metal carbamate, phenol type or wax type, may be used. As an aging-preventing agent species having a significant effect to improve the heat resistance, the amine type such as 4,4'-bis (α,α-dimethylbenzyl) diphenylamine or octylated diphenylamine may, for example, be mentioned. Particularly, 4,4'-bis (α,α-dimethylbenzyl) diphenylamine may further improve the heat resistance of the chloroprene type rubber composition of the present invention. These aging-preventing agents may be used alone or in combination as a mixture.

As the softening agent, a common softening agent such as a petroleum type softening agent such as lubricating oil, process oil, paraffin, liquid paraffin, Vaseline or petroleum asphalt, or an alphatic softening agent such as rapeseed oil, flaxseed oil, castor oil or coconut oil, may be used. As the plasticizer, a common plasticizer such as dioctyl phthalate or dioctyl adipate, may be used. As a plasticizer which will not inhibit or will increase the heat resistance of the chloroprene type rubber composition of the present invention, an ether/thioether type plasticizer such as Vulkanol TO (trade name, manufactured by Bayer Ltd.), a vegetable oil or an ester type plasticizer, or an ether/ester type plasticizer such as Adekacizer RS-700, RS-735 (trade names, manufactured by Asahi Denka Kogyo K.k.), may, for example, be mentioned. Particularly, an ether/thioether type plasticizer is preferred since it has effects to improve the low-temperature resistance as well as to increase the heat resistance, and it is excellent in the balance between them. Such plasticizers may be used alone or in combination as a mixture of two or more of them, depending upon the properties required.

With respect to the methods of kneading and vulcanizing the rubber composition in the present invention, methods which are commonly carried out in rubber industry, may be employed. Commonly, the rubber composition is mixed by a kneading machine such as a kneader, a Banbury mixer or a roll mill, followed by molding into a desired shape to obtain a molded vulcanizate. Specifically, various components are kneaded at a temperature of not higher than the vulcanization temperature, and the kneaded product is molded into a desired shape, followed by vulcanization. The temperature and the time for vulcanization may suitably be set. The vulcanization temperature is preferably from 140 to 190° C., more preferably from 150 to 180° C.

The vulcanizate obtained from the chloroprene type rubber composition of the present invention is excellent in, in addition to the mechanical properties of the rubber, the heat resistance, the oil resistance and the low-temperature resistance. Accordingly, it is suitable for industrial components, for which the heat resistance, the oil resistance and the low-temperature resistance are required, such as boots, hoses, belts, rubber vibration insulators, vibration dampers, electrical wires, gaskets, oil seals and packings, particularly for rubber components for automobiles, for which quality assurance and the heat resistance are strictly required.

BEST MODE FOR CARRYING OUT THE INVENTION

Now, the present invention will be explained in detail with reference to Examples. However, it should be understood that the present invention is by no means restricted to such specific Examples.

EXAMPLES 1 TO 5 AND COMPARATIVE EXAMPLES 1 TO 4

In accordance with the blend formulation as identified in Tables 1 and 2, kneading was carried out by using 8 inch rolls to prepare a sheet having a thickness of 2.3 mm. The sheet was subjected to press vulcanization at 150° C. for 20 minutes to prepare a vulcanized sheet having a thickness of 2 mm. Physical property tests were carried out by using No. 3 dumbbells, the tensile test was carried out in accordance with JIS K6251, and the hardness was measured in accordance with JIS K6253. Further, the low-temperature performance was evaluated by measurement by a Gehman twist test in accordance with JIS K6261, and was represented by T10 (the temperature at which the specific modulus as the value to the modulus at 23° C. becomes 10).

With respect to the heat resistance, using a test specimen preserved in a gear oven of 140° C. for 9 days in accordance with JIS K6257, the tensile test and the measurement of the hardness were carried out in accordance with the above-mentioned measuring methods, and the heat resistance was represented by the rates of change in tensile strength and elongation and the amount of change in hardness.

The average stacking height Lc (nm) in a C axis direction of the layer planes in the crystallites was calculated in accordance with the following formula from a (002) diffracted ray in an X-ray diffraction method employing Cu-Kα ray:

$Lc = (180 \cdot K \cdot \lambda)/(\pi \cdot \beta \cdot \cos\theta)$

K: Form factor (employing 0.9)

λ: Wavelength (0.154 nm) of the X-ray

θ: Angle representing the maximum value at the (002) diffracted ray absorption band β: Half value width at the (002) diffracted ray absorption band as represented by an angle

TABLE 1

|  |  | Ex. 1 | Ex. 2 | Ex. 3 | Ex. 4 | Ex. 5 | Comp. Ex. 1 | Comp. Ex. 2 |
|---|---|---|---|---|---|---|---|---|
| Chloroprene rubber | 1) | 100 | 100 | 100 | 100 | 100 | 100 | 100 |
| Stearic acid |  | 0.5 | 0.5 | 0.5 | 0.5 | 0.5 | 0.5 | 0.5 |
| Aging-preventing agent 4,4'-Bis(α,α-dimethylbenzyl)-diphenylamine |  | 6 | — | 6 | — | 6 | 6 | 6 |
| Aging-preventing agent Octylated diphenylamine |  | — | 6 | — | 6 | — | — | — |
| Aging-preventing agent Tris (nonylated phenyl) phosphite |  | 2 | 2 | 2 | 2 | 2 | 2 | 2 |
| MgO |  | 4 | 4 | 4 | 4 | 4 | 4 | 4 |
| Acetylene black | 2) | 45 | 45 | 20 | 45 | 45 | — | — |
| Carbon black (MAF) | 3) | — | — | — | — | — | 50 | — |
| Carbon black (N330:HAF) | 4) | — | — | — | — | — | — | 45 |
| Carbon black (N880:FT) | 5) | — | — | — | — | — | — | — |
| Vulkanol OT | 6) | 25 | 25 | — | — | — | 25 | 25 |
| Dioctyl sebacate |  | — | — | — | 25 | — | — | — |
| Dioctyl phthalate |  | — | — | — | — | 25 | — | — |
| Zn powder |  | 5 | 5 | 5 | 5 | 5 | 5 | 5 |
| ZnO |  | 5 | 5 | 5 | 5 | 5 | 5 | 5 |
| Ethylenethiourea |  | 1 | 1 | 1 | 1 | 1 | 1 | 1 |
| Tetramethylthiuramdisulfide |  | 0.3 | 0.3 | 0.3 | 0.3 | 0.3 | 0.3 | 0.3 |
| Properties of vulcanizate (vulcanization condition: 150° C. × 20 min) (Properties in ordinary state) |  |  |  |  |  |  |  |  |
| Tensile strength (MPa) |  | 15.6 | 15.7 | 18.6 | 15.5 | 15.7 | 18.0 | 18.9 |
| Elongation (%) |  | 630 | 620 | 610 | 600 | 610 | 420 | 370 |
| Hardness (JIS-A) |  | 57 | 56 | 57 | 57 | 57 | 57 | 56 |
| (Low-temperature resistance: Gehman twist test) T10 (° C.) |  | −45 | −45 | −37 | −49 | −43 | −44 | −44 |
| (Heat resistance: 140° C. × 9 days) |  |  |  |  |  |  |  |  |
| Rate of change in tensile strength (%) |  | −14 | −16 | −12 | −17 | −18 | −22 | −19 |
| Rate of change in elongation (%) |  | −16 | −24 | −2 | −25 | −25 | −36 | −36 |
| Change in hardness |  | +17 | +22 | +15 | +24 | +23 | +28 | +29 |

Materials used in Table 1 are as follows.

1) Mercaptan-modified chloroprene rubber (S-40V), manufactured by Denki Kagaku Kogyo K.K.

2) Denka Black granule product (Lc: 3.5 nm, DBP oil absorption: 210 ml/100 g), manufactured by Denki Kagaku Kogyo K.K.

3) Sheast 116 (Lc: at most 1.8 nm, DBP oil absorption: 133 ml/100 g), manufactured by Tokai Carbon K.K.

4) Sheast 3 (Lc: at most 1.8 nm, DBP oil absorption: 101 ml/100 g), manufactured by Tokai Carbon K.K.
5) Asahi Thermal FT (Lc: at most 1.8 nm, DBP oil absorption: 28 ml/100 g), manufactured by Asahi Carbon K.K.
6) Ether/tioether type plasticizer, manufactured by Bayer Ltd. (Germany)

TABLE 2

|  | Comp. Ex. 3 | Comp. Ex. 4 |
| --- | --- | --- |
| Chloroprene rubber 1) | 100 | 100 |
| Stearic acid | 0.5 | 0.5 |
| Aging-preventing agent 4,4'-Bis(α, α-dimethylbenzyl)-diphenylamine | 6 | 6 |
| Aging-preventing agent Octylated diphenylamine | — | — |
| Aging-preventing agent Tris(nonylated phenyl)phosphite | 2 | 2 |
| MgO | 4 | 4 |
| Acetylene black 2) | — | 45 |
| Carbon black (MAF) 3) | — | — |
| Carbon black (N330: HAF) 4) | — | — |
| Carbon black (N880: FT) 5) | 85 | — |
| Vulkanol TO 6) | 25 | 25 |
| Dioctyl sebacate | — | — |
| Dioctyl phthalate | — | — |
| Zn powder | 5 | — |
| ZnO | 5 | 5 |
| Ethylenethiourea | 1 | 1 |
| Tetramethylthiuramdisulfide | 0.3 | 0.3 |
| Properties of vulcanizate (vulcanization condition: 150° C. × 20 min) (Properties in ordinary state) |  |  |
| Tensile strength (MPa) | 13.9 | 15.7 |
| Elongation (%) | 510 | 630 |
| Hardness (JIS-A) | 57 | 56 |
| (Low-temperature resistance: Gehman twist test) |  |  |
| T10 (° C.) | −41 | −46 |
| (Heat resistance: 140° C. × 9 days) |  |  |
| Rate of change in tensile strength (%) | −22 | −19 |
| Rate of change in elongation (%) | −31 | −29 |
| Change in hardness | +28 | +27 |

As shown in Tables 1 and 2, the chloroprene type rubber composition of the present invention, which comprises chloroprene rubber, and a carbon black having an average stacking height Lc of at least 2 nm in a C axis direction of the layer planes in the crystallites and a zinc powder incorporated to said chloroprene rubber, provides a vulcanizate having an excellent heat resistance.

What is claimed is:

1. A chloroprene rubber composition which comprises a chloroprene rubber, a carbon black having an average stacking height Lc of at least 2 nm in a C axis direction of the layer planes in the crystallites, and a zinc powder.

2. The chloroprene rubber composition according to claim 1, wherein from 10 to 70 parts by weight of the carbon black and from 1 to 30 parts by weight of the zinc powder are blended based on 100 parts by weight of the chloroprene rubber.

3. A vulcanizate which is obtained by vulcanizing the chloroprene rubber composition as defined in claim 1.

4. The chloroprene rubber composition according to claim 1, wherein the carbon black is acetylene black.

5. The chloroprene rubber composition according to claim 1, wherein the carbon black comprises acetylene black and at least one of thermal black, furnace black and channel black.

6. The chloroprene rubber composition according to claim 2, wherein the carbon black is acetylene black.

7. The chloroprene rubber composition according to claim 2, wherein the carbon black comprises acetylene black and at least one of thermal black, furnace black and channel black.

8. The chloroprene rubber composition according to claim 1, wherein the carbon black has an average particle size of at most 60 nm.

9. The chloroprene rubber composition according to claim 2, wherein the carbon black has an average particle size of at most 60 nm.

10. The chloroprene rubber composition according to claim 4, wherein the carbon black has an average particle size of at most 60 nm.

11. The chloroprene rubber composition according to claim 5, wherein the carbon black has an average particle size of at most 60 nm.

12. The chloroprene rubber composition according to claim 6, wherein the carbon black has an average particle size of at most 60 nm.

13. The chloroprene rubber composition according to claim 7, wherein the carbon black has an average particle size of at most 60 nm.

14. The chloroprene rubber composition according to claim 1, wherein the carbon black has a DBP oil absorption of 100 to 350 ml/100 g.

15. The chloroprene rubber composition according to claim 2, wherein the carbon black has a DBP oil absorption of 100 to 350 ml/100 g.

16. The chloroprene rubber composition according to claim 4, wherein the carbon black has a DBP oil absorption of 100 to 350 ml/100 g.

17. The chloroprene rubber composition according to claim 5, wherein the carbon black has a DBP oil absorption of 100 of 350 ml/100 g.

18. The chloroprene rubber composition according to claim 6, wherein the carbon black has a DBP oil absorption of 100 to 350 ml/100 g.

19. The chloroprene rubber composition according to claim 7, wherein the carbon black has a DBP oil absorption of 100 to 350 ml/100 g.

20. A vulcanizate which is obtained by vulcanizing the chloroprene rubber composition as defined by claim 2.

21. A vulcanizate which is obtained by vulcanizing the chloroprene rubber composition as defined by claim 4.

22. A vulcanizate which is obtained by vulcanizing the chloroprene rubber composition as defined by claim 5.

23. A vulcanizate which is obtained by vulcanizing the chloroprene rubber composition as defined by claim 6.

24. A vulcanizate which is obtained by vulcanizing the chloroprene rubber composition as defined by claim 7.

* * * * *